US007912999B2

(12) United States Patent
Boesel et al.

(10) Patent No.: US 7,912,999 B2
(45) Date of Patent: Mar. 22, 2011

(54) BUFFERING METHOD AND APPARATUS FOR PROCESSING DIGITAL COMMUNICATION SIGNALS

(75) Inventors: Robert W. Boesel, San Diego, CA (US); Theodore J. Myers, San Diego, CA (US); Tien Q. Nguyen, San Diego, CA (US)

(73) Assignee: Freescale Semiconductor, Inc., Austin, TX (US)

( * ) Notice: Subject to any disclaimer, the term of this patent is extended or adjusted under 35 U.S.C. 154(b) by 1383 days.

(21) Appl. No.: 10/613,897

(22) Filed: Jul. 2, 2003

(65) Prior Publication Data

US 2004/0004995 A1 Jan. 8, 2004

Related U.S. Application Data

(60) Provisional application No. 60/393,633, filed on Jul. 3, 2002.

(51) Int. Cl.
| G06F 3/00 | (2006.01) |
| G06F 5/00 | (2006.01) |
| G06F 1/00 | (2006.01) |
| G06F 1/04 | (2006.01) |
| H04J 11/00 | (2006.01) |
| H04B 7/216 | (2006.01) |
| H04B 1/00 | (2006.01) |
| H04L 12/28 | (2006.01) |

(52) U.S. Cl. ............... 710/52; 710/30; 710/53; 710/56; 370/203; 370/335; 370/412; 370/464; 713/322; 713/323; 713/503; 713/600; 713/601; 375/147; 375/148; 375/150

(58) Field of Classification Search ..................... None
See application file for complete search history.

(56) References Cited

U.S. PATENT DOCUMENTS

| 4,347,580 A | 8/1982 | Bond |
| 4,484,028 A | 11/1984 | Kelley et al. |
| 4,550,414 A | 10/1985 | Guinon et al. |
| 4,841,574 A * | 6/1989 | Pham et al. ................. 704/201 |
| 4,991,088 A | 2/1991 | Kam |
| 5,164,959 A | 11/1992 | Cai et al. |
| 5,461,630 A | 10/1995 | Endo et al. |
| 5,838,671 A | 11/1998 | Ishikawa et al. |
| 5,864,714 A * | 1/1999 | Tal et al. ........................ 710/56 |
| 5,892,980 A * | 4/1999 | Tal et al. ........................ 710/56 |
| 5,963,563 A | 10/1999 | Tomikura et al. |

(Continued)

OTHER PUBLICATIONS

International Search Report for International PCT Application No. PCT/US2003/021055, dated Jan. 14, 2004.

(Continued)

*Primary Examiner* — Tariq Hafiz
*Assistant Examiner* — Henry Yu
(74) *Attorney, Agent, or Firm* — Ingrassia Fisher & Lorenz, P.C.

(57) ABSTRACT

A buffering apparatus to process digital communication signals includes a plurality of buffers, a processing unit, and programmed memory. The programmed memory has instructions directing the processing unit to process the digital samples corresponding to a group of symbols to be processed in a plurality of buffers. The digital samples start in a first buffer of the plurality of buffers and end in a second buffer of the plurality of buffers. The digital samples are received at a third buffer of the plurality of buffers during the processing of the digital samples.

15 Claims, 16 Drawing Sheets

U.S. PATENT DOCUMENTS

| | | | |
|---|---|---|---|
| 6,108,693 A * | 8/2000 | Tamura | 709/213 |
| 6,115,728 A * | 9/2000 | Nakai et al. | 708/404 |
| 6,122,444 A * | 9/2000 | Shen et al. | 710/52 |
| 6,167,062 A | 12/2000 | Hershey et al. | |
| 6,304,978 B1 * | 10/2001 | Horigan et al. | 713/322 |
| 6,351,714 B1 * | 2/2002 | Birchmeier | 702/56 |
| 6,356,581 B1 * | 3/2002 | Nguyen et al. | 375/148 |
| 6,401,162 B1 * | 6/2002 | Nasserbakht | 711/5 |
| 6,496,795 B1 | 12/2002 | Malvar | |
| 6,577,649 B1 | 6/2003 | Leibowitz et al. | |
| 6,603,801 B1 | 8/2003 | Arden et al. | |
| 6,615,307 B1 * | 9/2003 | Roohparvar | 711/103 |
| 6,647,056 B1 | 11/2003 | Imaizumi et al. | |
| 6,650,140 B2 * | 11/2003 | Lee et al. | 326/39 |
| 6,650,694 B1 | 11/2003 | Brown et al. | |
| 6,714,527 B2 * | 3/2004 | Kim et al. | 370/335 |
| 6,721,295 B1 * | 4/2004 | Brown | 370/335 |
| 6,748,010 B1 | 6/2004 | Butler et al. | |
| 6,795,489 B2 | 9/2004 | Joshi et al. | |
| 6,853,839 B2 | 2/2005 | Usuda et al. | |
| 6,928,566 B2 * | 8/2005 | Nunomura | 713/322 |
| 6,928,575 B2 * | 8/2005 | Okabayashi et al. | 713/503 |
| 6,985,516 B1 | 1/2006 | Easton et al. | |
| 7,035,318 B2 | 4/2006 | Taniguchi et al. | |
| 7,039,000 B2 * | 5/2006 | You et al. | 370/203 |
| 2001/0002199 A1 | 5/2001 | Hershey et al. | |
| 2001/0036195 A1 | 11/2001 | Garyantes et al. | |
| 2001/0038633 A1 * | 11/2001 | Robertson et al. | 370/412 |
| 2001/0055334 A1 * | 12/2001 | Tiedemann et al. | 375/225 |
| 2002/0094017 A1 | 7/2002 | Wang | |
| 2002/0176489 A1 * | 11/2002 | Sriram et al. | 375/150 |
| 2003/0009772 A1 * | 1/2003 | Karr | 725/142 |
| 2003/0021334 A1 * | 1/2003 | Levin et al. | 375/147 |
| 2003/0099210 A1 | 5/2003 | O'Toole et al. | |
| 2003/0128678 A1 | 7/2003 | Subrahmanya et al. | |
| 2003/0147365 A1 | 8/2003 | Terasawa et al. | |
| 2003/0235238 A1 | 12/2003 | Schelm et al. | |
| 2004/0165567 A1 | 8/2004 | Kim et al. | |

OTHER PUBLICATIONS

Loeliger, "Probability propagation and decoding in analog VLSI." IEEE Transactions on Information Theory, 47(2): 837-841, 2001.
Office Action dated Apr. 17, 2007 U.S. Appl. No. 10/613,825.
Office Action dated Sep. 28, 2007 U.S. Appl. No. 10/613,825.
Office Action dated Jun. 6, 2008 U.S. Appl. No. 10/613,825.
Office Action dated Dec. 3, 2008 U.S. Appl. No. 10/613,825.
Office Action dated Jun. 4, 2009 U.S. Appl. No. 10/613,825.
Office Action dated Apr. 16, 2008 U.S. Appl. No. 10/613,853.
Quayle Action dated Nov. 12, 2008 U.S. Appl. No. 10/613,853.
Office Action dated Feb. 19, 2009 U.S. Appl. No. 10/613,853.
Office Action dated Oct. 5, 2006 U.S. Appl. No. 10/613,477.
Office Action dated Jun. 13, 2007 U.S. Appl. No. 10/613,477.
Office Action dated Aug. 26, 2008 U.S. Appl. No. 10/613,477.
Office Action dated Dec. 23, 2008 U.S. Appl. No. 10/613,477.
Office Action dated Jul. 27, 2009 U.S. Appl. No. 10/613,477.
Office Action dated Jul. 31, 2007 U.S. Appl. No. 10/613,476.
Qualye dated Dec. 26, 2007 U.S. Appl. No. 10/613,476.

* cited by examiner

US 7,912,999 B2

BUFFERING METHOD AND APPARATUS FOR PROCESSING DIGITAL COMMUNICATION SIGNALS

CROSS REFERENCE TO RELATED APPLICATIONS

The present application is related to and claims priority from U.S. Provisional Patent Application No. 60/393,633 entitled METHOD AND APPARATUS FOR DEMODULATING SPREAD SPECTRUM SIGNALS IN MULTI-PATH ENVIRONMENT, filed on Jul. 3, 2002.

The present application is also related to U.S. patent application Ser. No. 10/613,825 entitled VIRTUAL FINGER METHOD AND APPARATUS FOR PROCESSING DIGITAL COMMUNICATION SIGNALS, and U.S. patent application Ser. No. 10/613,477 entitled SEARCHING METHOD AND APPARATUS FOR PROCESSING DIGITAL COMMUNICATION SIGNALS, both of which are assigned to the same assignee as the present application and are filed on an even date herewith.

FIELD OF THE INVENTION

The present invention is related to communication systems capable of communicating signals. More particularly, the present invention relates to a buffering method and apparatus for processing digital communication signals.

BACKGROUND OF THE INVENTION

In general, conventional digital communication systems include a baseband subsystem in which received signals are demodulated and transmitted signals are modulated. Demodulators in baseband subsystems have been implemented using an application specific integrated circuit (ASIC) or a digital signal processor (DSP) or combination thereof. However, known demodulator implementations suffer from significant drawbacks.

FIG. 1 illustrates a conventional implementation of a spread-spectrum demodulator 10. The demodulator 10 includes a combiner 12 that combines symbols received from Fingers 1, 2, through Finger N (hereinafter referred collectively as fingers 14). Fingers 14 are instantiations of hardware logic for each multi-path processing entity, or "path." The combiner 12 de-skews or aligns in time the symbols from the fingers 14 and adds the symbols together to form an estimate of the transmitted symbol value. Once steady-state is reached, an output of the combiner 12 occurs synchronously with the symbol reception at the antenna.

Demodulator 10 has several disadvantages. For example, several disadvantages in using the demodulator 10 result from the synchronous processing based on clock signal from a master timer 16. Another disadvantage is that the demodulator 10 uses multiple, static instantiations of the fingers 14. The number of fingers 14 is selected based on the worst-case channel condition possible, representing the largest possible number of gates needed. To support more and more multi-path signals and to be compatible with advanced wireless techniques such as MIMO (multiple input multiple output antennas), current conventional architectures have been instantiating more and more fingers. More fingers require more power.

Another disadvantage of the demodulator 10 is a slow assignment or de-assignment of fingers 14, thereby wasting power. Turning on and off fingers 14 via assignment and de-assignment is a relatively slow process. As a result, there is a significant lag between a path dying and a finger shutting off. This results in higher power consumption with no corresponding gain in performance.

Yet another disadvantage of the demodulator 10 results from the use of a clock with the fingers 14 and the fact that the fingers 14 operate in parallel. All of the fingers 14 are synchronized based on a clock signal, regardless of whether a specific finger is used (assigned) and for how long it is used. A clocked finger, even when de-assigned, still consumes considerable power.

Even when a finger is assigned and demodulating a strong, needed path, it is still being clocked at a rate greatly in excess of the rate that useful output is being produced. As such, power is wasted. In general, clock buffers use ⅓ of device power, even if no useful processing is performed.

Yet another drawback to the demodulator 10 is the design of static bit widths, which are set for worst-case operation. This design causes excessive power consumption when the full number of bits is not required for demodulation. Most of the time, fewer bits are actually needed.

Another drawback to the demodulator is that its construction makes a MIMO solution costly and ineffective from a power standpoint. In the case of Multiple Outputs (MO), the number of fingers must be doubled to achieve the intended diversity effect. For Multiple Input (MI) techniques, such as STS and STTD, a multiplier must be added to each finger and all fingers are forced to always process both incoming antenna streams. This inefficiency results in more fingers, which only magnifies the power problems discussed above.

Thus, there is a need to reduce circuit complexity, gate count, and power consumption by using a single demodulation element that is capable of demodulating multi-path spread spectrum signals in an optimum manner. Further, there is a need to provide an improved method of demodulating multi-path signals. Further still, there is a need for a buffering method and apparatus for processing digital communication signals. Yet further, there is a need to have common circuitry for both transmit and receive operations in a digital communication system.

SUMMARY OF THE INVENTION

An exemplary embodiment relates to a method of processing digital communication signals in a system including a plurality of buffers. The method includes processing from all known paths of a first group of symbols where buffered digital samples corresponding to the symbols start in a first buffer and end in a second buffer, and receiving samples at a third buffer during the processing of symbols. The method also includes processing from all known paths of a second group of symbols where buffered digital samples corresponding to the symbols start in the second buffer and end in the third buffer, and receiving samples at the first buffer during the processing of the symbols. The method further includes processing from all known paths of a third group of symbols where buffered digital samples corresponding to the symbols start in the third buffer and end in the first buffer, and receiving samples at the second buffer during the processing of the symbols.

Another exemplary embodiment relates to an apparatus to process digital communication signals. The apparatus includes a plurality of buffers, a processing unit, and programmed memory having instructions directing the processing unit to process the digital samples corresponding to a group of symbols to be processed in a plurality of buffers. The digital samples start in a first buffer of the plurality of buffers and end in a second buffer of the plurality of buffers. The digital samples are received at a third buffer of the plurality of buffers during the processing of the digital samples.

Another exemplary embodiment relates to a method of processing digital communication signals. The method includes receiving a communication signal at a receiver, communicating digital samples from the received communication signal to sample buffers where the digital samples include symbols, and processing the symbols in a first group of sample buffers and receiving digital samples from the receiver at a second group of sample buffers.

Other principle features and advantages of the invention will become apparent to those skilled in the art upon review of the following drawings, the detailed description, and the appended claims.

BRIEF DESCRIPTION OF THE DRAWINGS

The exemplary embodiments will hereafter be described with reference to the accompanying drawings, wherein like numerals will denote like elements, and.

DETAILED DESCRIPTION OF EXEMPLARY EMBODIMENTS

Figure 1:
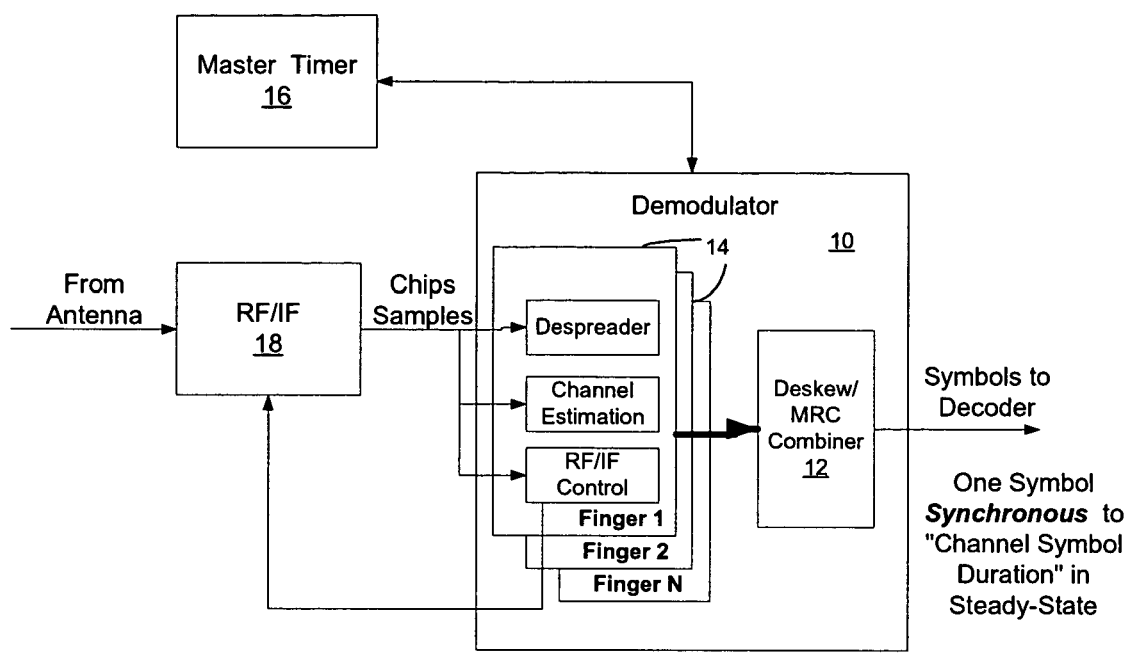
FIG. 1 is a diagrammatic representation of a conventional spread spectrum demodulator.
Figure 2:
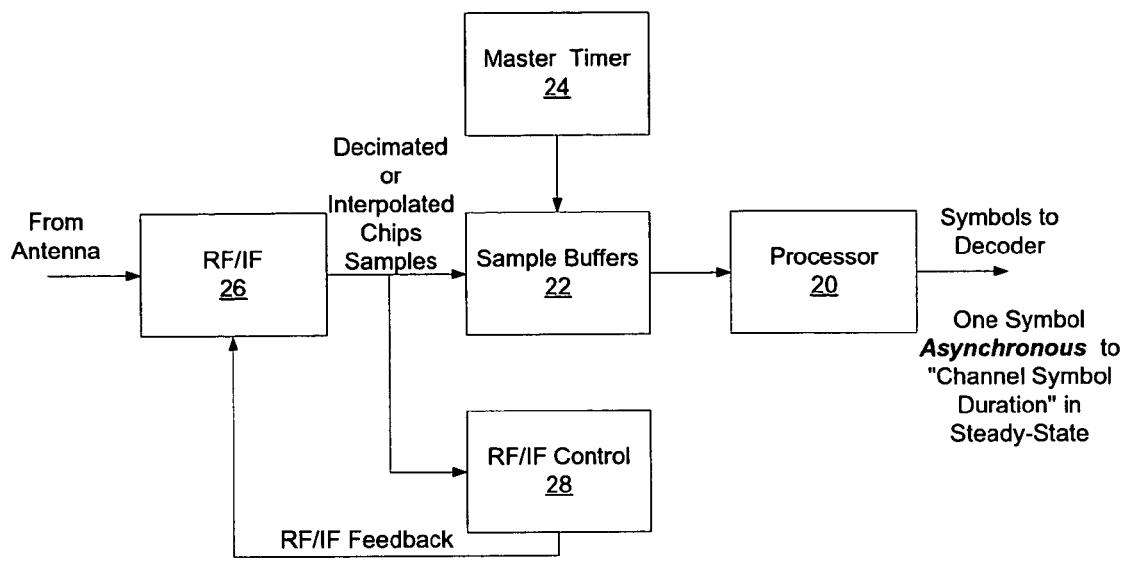
FIG. 2 is a diagrammatic representation of a multi-path processing system in accordance with an exemplary embodiment

In accordance with at least one exemplary embodiment, FIG. 2 illustrates a multi-path communication processing system including a processor 20 that receives signals in the form of sub-chip samples from sample buffers 22. Sample buffers 22 receive timing input from a master timer 24 and chip samples (modulated signals in a spread spectrum system) from a receiver 26. The receiver 26 can be a radio frequency (RF) or an intermediate frequency (IF) type receiver. The chip samples provided to sample buffers 22 can be decimated or interpolated. A control 28 provides feedback to the receiver 26.

Sample buffers 22 can store an amount of data referred to as a "Symbol Group." Advantageously, sample buffers 22 make it possible for the processor 20 to not be synchronously clocked by the sample rate because the processor 20 can obtain data from sample buffers 22 as needed. In this way, the processor 20 operates as more like a processor than an application specific integrated circuit (ASIC), working at the fastest clock rate that the silicon technology will support.

Figure 3:
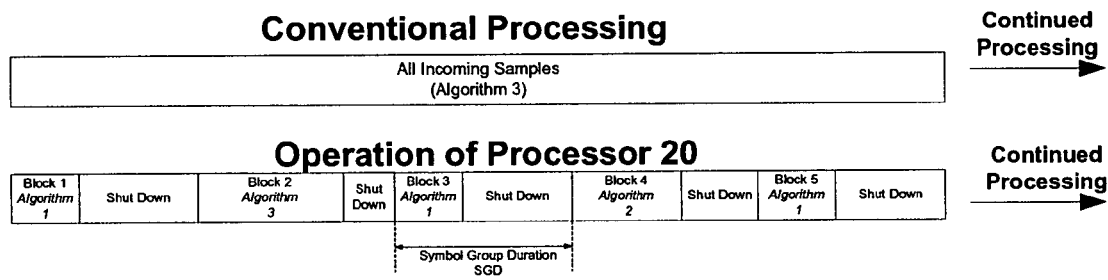
FIG. 3 is a diagrammatic representation comparing the operation of a conventional demodulator with the demodulator of the system of FIG. 2.

FIG. 3 illustrates operation of the processor 20 compared to operation of a conventional synchronous implementation. Whereas the conventional implementation operates continuously and relatively uniformly on incoming chips, the processor 20 does the required amount of processing at the fastest clock rate available in a serial fashion. This speed enables the processor 20 to finish its processing before the time needed for the next buffer to fill and require servicing (i.e., a Symbol Group Duration). As shown in FIG. 3, prior to an end of a first Symbol Group Duration, the processor 20 can be shut down (i.e., the clock is gated off) through a remainder of and until the completion of the first Symbol Group Duration, and the processor 20 is enabled at the beginning of a next Symbol Group Duration that occurs consecutively with the end of the first Symbol Group Duration. As also shown in FIG. 3 by the width of block sections, the given amount of processing may vary from Symbol Group to Symbol Group.

In an exemplary embodiment, the processor 20 is configured to provide dynamic path processing. This dynamic path processing can be referred to as a "virtual finger" feature because the multi-path communication paths, or fingers, are not actual hardwired circuits but rather paths defined using various algorithms. During the period of inactivity between completion of processing and waiting for the sample buffer to synchronously fill (the shaded regions), the clock is disabled. This can be seen in FIG. 3 in the shaded "Shut Down" region. As a result, there is no idle power loss from the processor 20 due to capacitive loading on the clock tree resulting from clock ticks on the circuitry without activity. In conventional systems using an ASIC for demodulation operations, only a small fraction of the clock ticks produce useful output from the ASIC.

As an example of why the processing time varies, consider the case where three "fingers" are assigned, but two of these "fingers" are assigned to multi-path components in a deep fade so as to render them non-productive in the demodulation process. The amount of time that the processor 20 would be actively processing this block would be approximately ⅓ of the worst case. This varying number of fingers is just one example of the dynamic processing capability.

Another example of the dynamic processing ability of the processor 20 is the dynamic setting of bit-widths. Dynamically processing the bits is particularly beneficial because fewer bits are usually needed to produce a decodable output than the instantaneous worst case. By processing fewer bits on average, less power is consumed.

Bits can be treated like paths, in that they can be separately processed, because of the linearity in most demodulation processing (e.g., de-spreading, accumulation, MRC) such that many bits can be divided into sub-units of bits. If the processor 20 were designed in this fashion, it would be composed of small bit-width circuitry. In the presence of a fade, where more bits are necessary on a given path, the same path would be processed several times, each on a different sub-unit of bits (i.e. first the LSB sub-unit and last the MSB sub-unit). Each time a sub-unit is processed, the de-spreaded output is appropriately shifted and accumulated into a symbol buffer. Such processing is simply another kind of Accumulated Maximal Ratio Combining (A-MRC) algorithm with the paths being replaced by sub-units of bits in the algorithm.

Another exemplary way the processor 20 can dynamically set bit-widths is by using a programmable ASIC. If only a few bits are needed, the data is shifted to the right such that the number of toggling bits in the demodulator are reduced.

Advantageously, for products that already contain a processor (e.g., DSP, GSP, ARM) for various applications (e.g., voice processing, video drivers, MPEG, JPEG), the processor 20 can offload some of the low processing intensive operations that are typically forced into ASIC. The buffering nature of the processor 20 operation can be exploited to eliminate the stringent real-time DSP deadlines that typically force these operations into ASIC. Because samples are buffered, stringent real-time processor deadlines are no longer in force.

The dynamic selection of variables that control the majority of demodulation power consumption significantly optimizes power consumption. Thus, the processor can offload many relatively non-computationally intensive tasks including Multipath Finger Assignment, Equalization/Interpolation/MRC Tap Weight Calculation, NCO Stride Selection, and Time Tracking. Offloading this functionality into the processor 20 represents a saving in silicon area, yielding lower cost in addition to reduced development risks. Incorporating a processor into the demodulation algorithm reduces power consumption, too.

Figure 4:
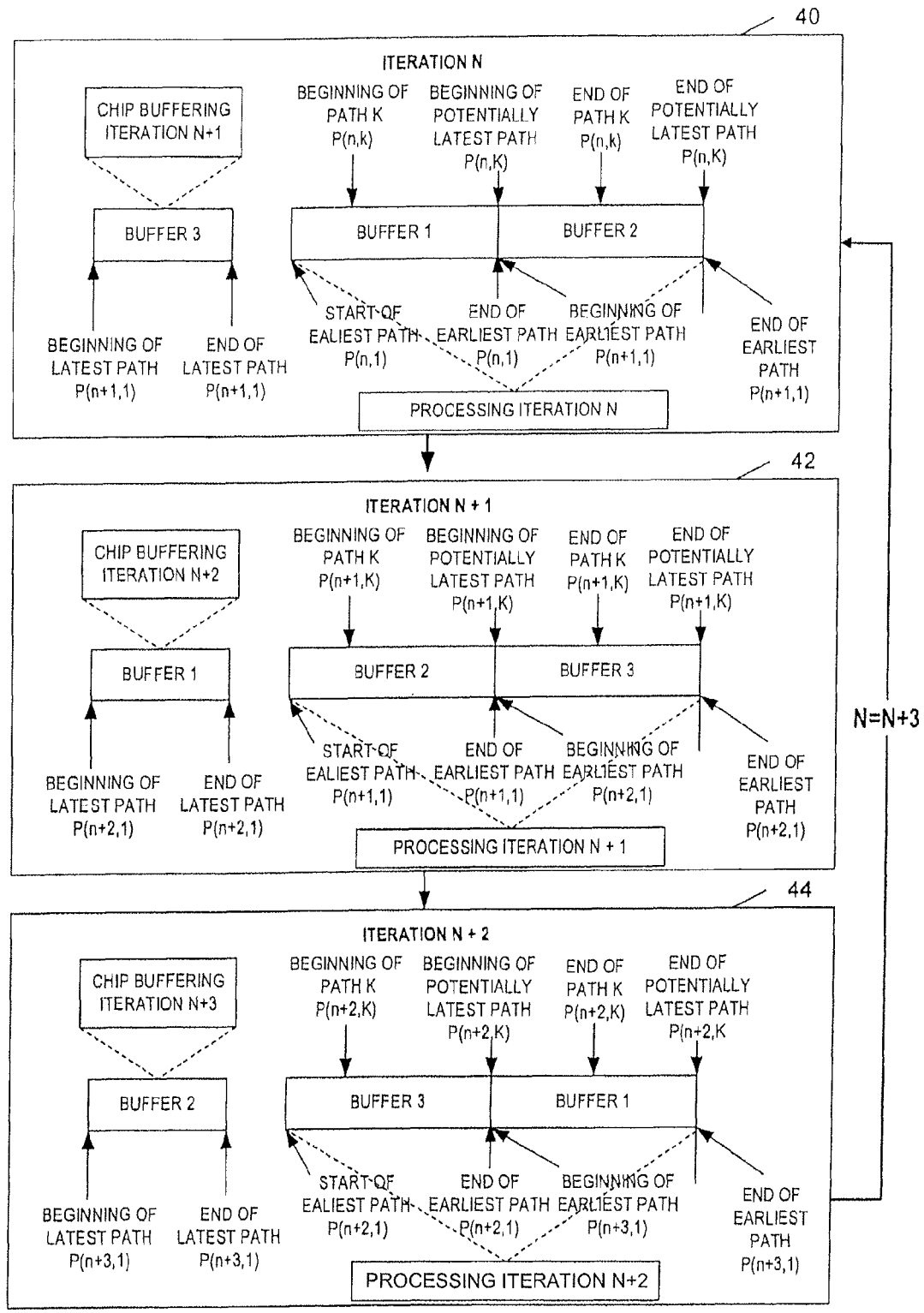
FIG. 4 is a diagrammatic representation of a minimal buffer operation in accordance with an exemplary embodiment.

FIG. 4 illustrates the operation of an exemplary buffering scheme. A "buffer" is a memory element including two sets of data/address ports—one for read and one for write. The buffer does not have to support simultaneous read/write access. Any given cycle is either read or write or both. The selection criteria of this exemplary buffer scheme is to use a small amount of RAM for the chip memory, yet have very simple operation of the processor. At any given time, the processor is processing on two of the buffers that are logically functioning as one.

A state 40 in FIG. 4 shows that during iteration N, Buffer 1 and Buffer 2 are serving as a single logical data source. With this scheme, all symbols whose earliest path begins in Buffer 1 are processed to completion (all multi-paths are combined), which entails using the chips in Buffer 2 for the later paths of these symbols. Those symbols whose earliest paths occur in Buffer 2 are not processed until iteration N+1 in a state 42 as shown in FIG. 4.

Meanwhile, Buffer 3 is receiving the samples occurring during the processing of the logical combination of Buffer 1 and Buffer 2. During iteration N+1 in state 42, the processor processes those symbols whose earliest path are in Buffer 2 while using the contents of Buffer 3 as the necessary later arriving paths which also must be present to complete the symbol processing. Advantageously, these operations allow for complete symbol processing during any iteration which eliminates the requirement of many state variables to keep track of the partial processing between iterations, and more complicated control logic to allow "fast-forwarding" through states to reach partial symbols.

The larger sample buffer size is used when other requirements drive the necessity of a larger buffer size. For example, consider the following: for protocols having continuous pilots (e.g., cdma2000, W-CDMA), the driving requirement of sample buffer size is the multi-path delay spread such that all data for symbol processing is accessible to the processor simultaneously. For burst-pilot wireless technologies such as 1xEV-DO, the burst spacing is the more stringent requirement for determining buffer size. The processor must have simultaneous access to all the data stored between pilot bursts, in addition to the later pilot burst for linear interpolation of the channel estimate to be performed which is vital for demodulation performance for the automatic frequency control (AFC) drift that is ever-present.

Figure 5:
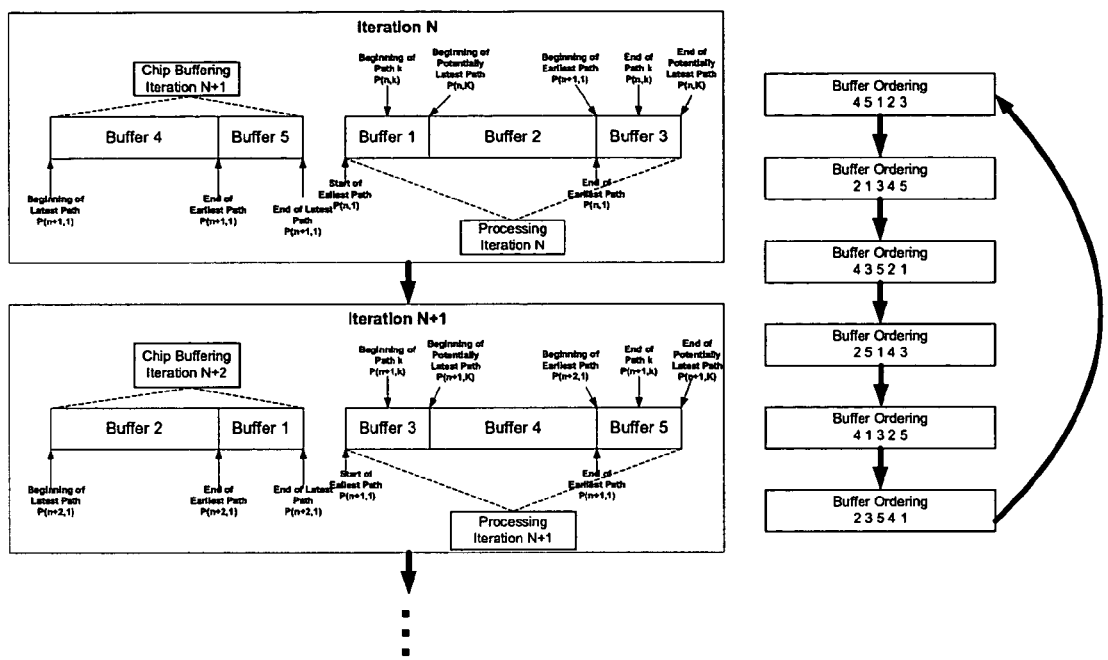
FIG. 5 is a diagrammatic representation of another exemplary buffer operation.

FIG. 5 illustrates an exemplary buffering scheme for wireless technologies that use burst-pilot. Initially, Buffers 1, 2, and 3 serve as a single logical data source to the processor 20 (FIG. 2). Buffers 4 and 5 serve as a single logical memory element that captures the synchronously arriving samples from the ADC. All symbols whose earliest arriving multi-path components are contained in Buffers 1 and 2 are completely processed during iteration N. This operation uses the samples in Buffer 3 in order to process the later arriving multi-path components. The processing of the symbols whose earliest arriving multi-path components are contained in Buffer 3 is deferred until iteration N+1. Therefore, during iteration N+1, Buffers 3, 4, and 5 serve as the single logical entity for processing.

Figure 6:
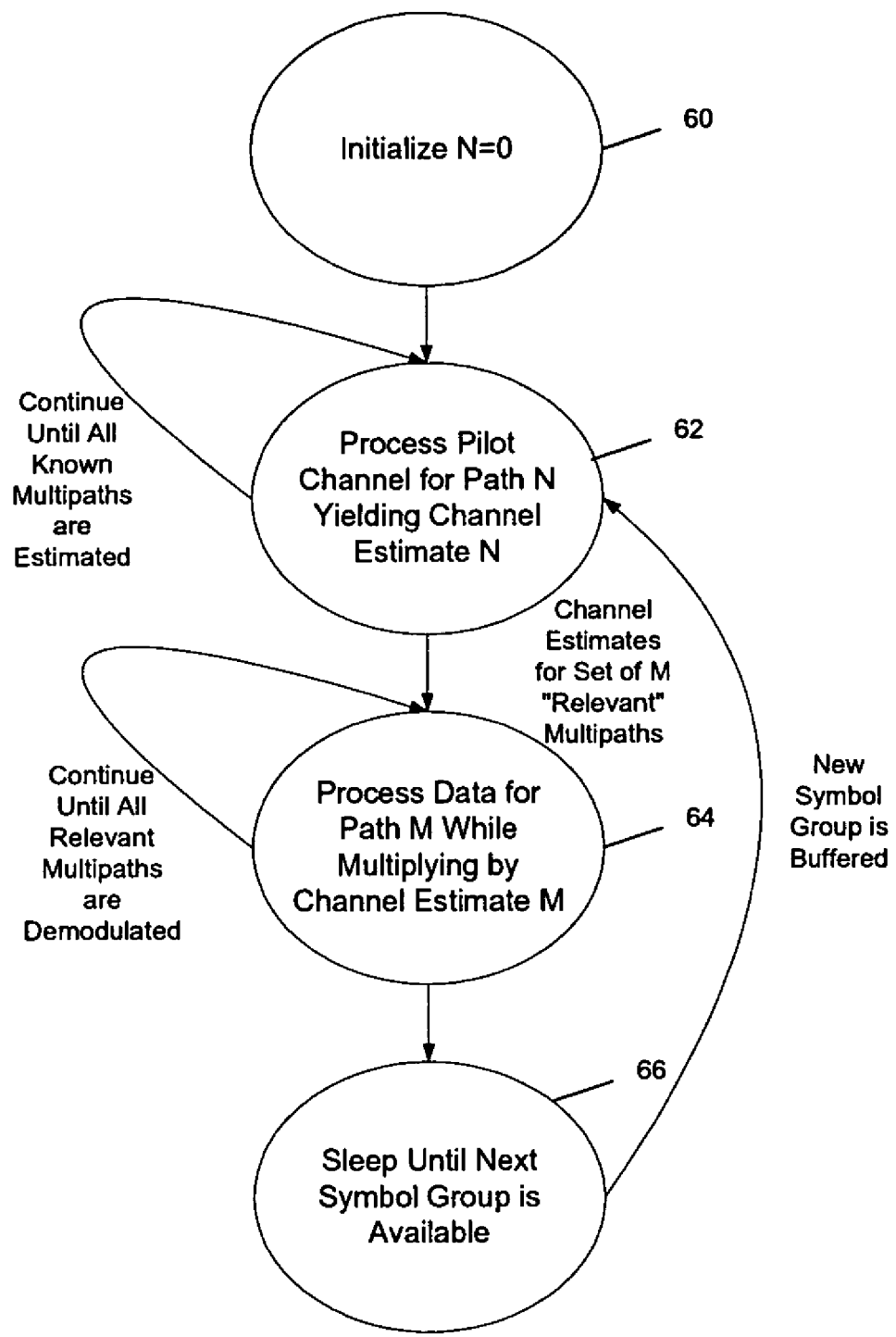
FIG. 6 is a diagrammatic representation of an Accumulated Maximal Ratio Combining (A-MRC) processing operation in accordance with an exemplary embodiment.

FIG. 6 illustrates operations in an Accumulated Maximal Ratio Combining (A-MRC) procedure of the processor 20 described with reference to FIG. 2. As can be seen here, operations are performed serially. In an operation 60, the number of paths, N, is set to zero. In an operation 62, a pilot channel for path N is processed, yielding a channel estimate. Operation 62 continues until all known multi-paths are estimated. Advantageously, the number of paths, N, can vary over time.

Once all known multi-paths are estimated, channel estimates for a set of M relevant multi-paths are used in data de-spreading in an operation 64. Notably, multi-paths can refer to communication signals from the one base station, other base stations, one antenna, or other antennas. In operation 64, data for path M is processed while multiplying by the channel estimate. Operation 64 continues until all relevant multi-paths for all channels are demodulated. In an operation 66, the processor sleeps until the next symbol group is available.

Figure 7:
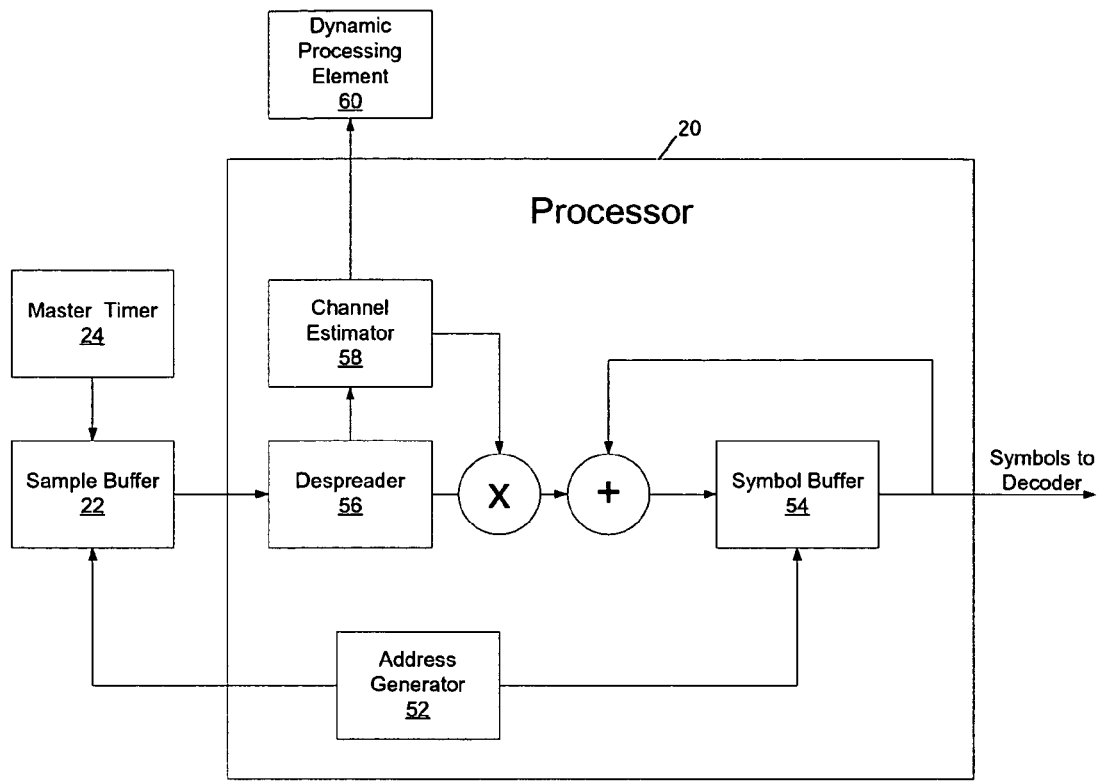
FIG. 7 is a diagrammatic representation of an Accumulated Maximal Ratio Combining (A-MRC) algorithm processing units in accordance with an exemplary embodiment.

FIG. 7 shows exemplary processing blocks of the processor 20 that are specific to the A-MRC algorithm. The Master Timer 24 is used to determine the beginning of the Processing Interval. At the beginning of the Processing Interval, the processor 20 begins processing of sub-chip samples.

An address generator 52 decimates the samples to the correct rate and phase by initializing to the buffer address corresponding to the desired sub-chip phase. To keep proper sub-chip phase alignment, the address generator 52 is advanced the number of sub-chips per access. A despreader 56 and a channel estimator 58 serially despread and accumulate the paths into a Symbol Buffer 54.

Figure 8:
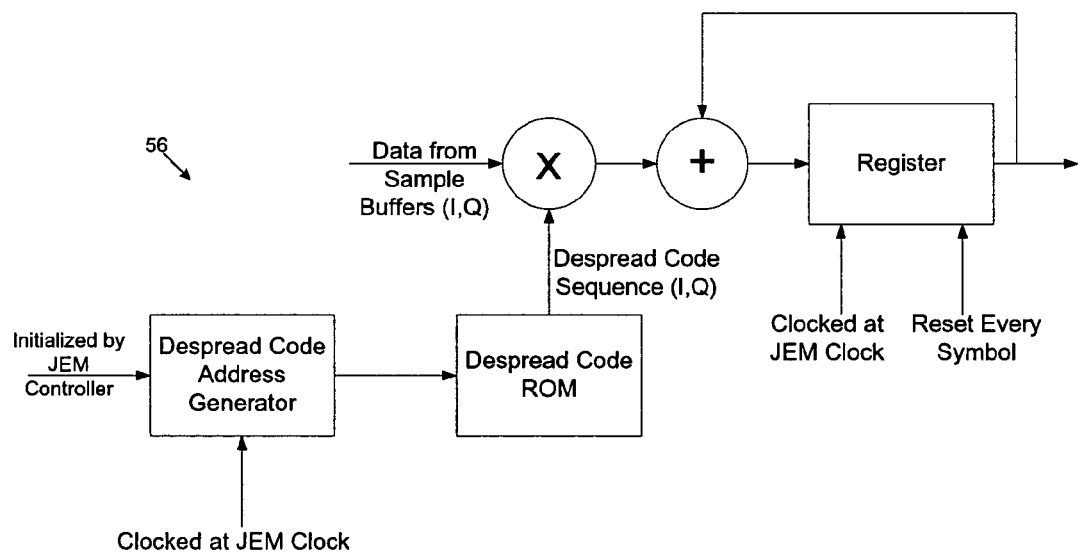
FIG. 8 is a diagrammatic representation of the Accumulated Maximal Ratio Combining (A-MRC) despreader of FIG. 7.

FIG. 8 illustrates the despreader 56 for the A-MRC algorithm. When performing the channel estimation, the despreader 56 operates by multiplying by the known pilot sequence, and inserting the correlation value into a channel estimator 58. During the demodulation of the data, the despreader 56 multiplies the on-phase sub-chip samples by the correct PN and channelization code (e.g., Walsh, OVSF, etc.) and outputs the value at symbol rate. The complex symbols are then multiplied by the channel estimate from the path and accumulated into the symbol buffer 54. In other words, the complex symbols are read, added to the current value, and written back into the symbol buffer 54. The MRC estimates are valid at the end of processing the relevant multi-paths and are ready for symbol processing (e.g., deinterleaving, depuncturing, and decoding).

Figure 9:
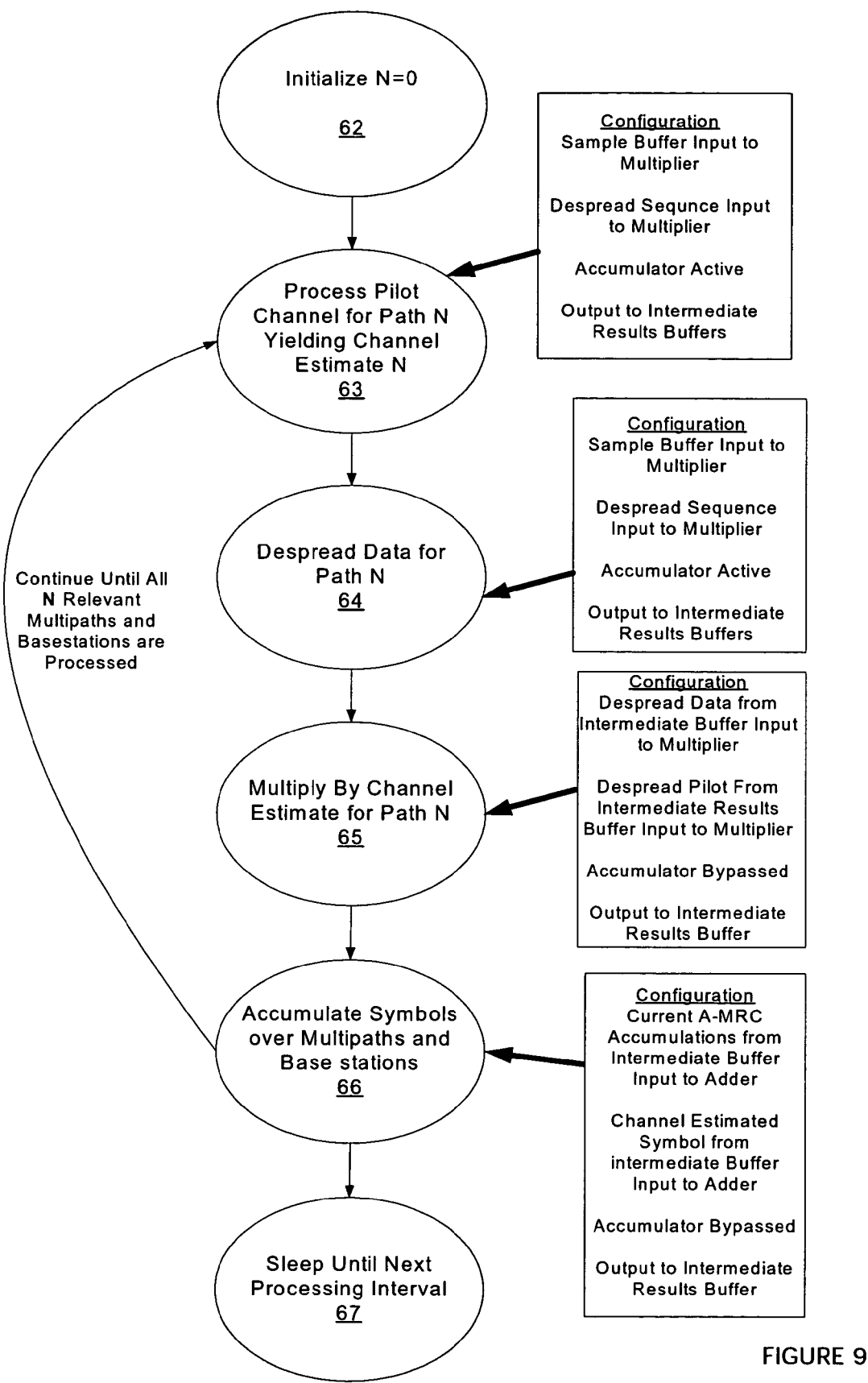
FIG. 9 is a diagrammatic representation of the Accumulated Maximal Ratio Combining (A-MRC) algorithm of FIG. 6 in greater detail.

FIG. 9 illustrates in more detail operations performed in the Accumulated Maximal Ratio Combining (A-MRC) procedure described with reference to FIG. 6. In a state 62, a multi-path counter, N, corresponding to which multi-path component is being processed, is set to zero. In a state 63, a pilot channel for path N is processed, yielding a channel estimate for path N. Pilot channel processing includes multiplying values from a sample buffer and a despread sequence generator. The samples from the pilot channel are accumulated and output to intermediate results buffers. As such, a channel estimate is established for a path N. In a state 64, data for path N is despread and output to the intermediate results buffer.

In a state 65, the channel estimate for path N is multiplied by the despread data of path N, the accumulator is bypassed, and the output is sent to intermediate buffers. In a state 66, symbols from the path N are accumulated over multi-paths and base stations. The current MRC accumulation of the group of symbols (which are initialized to zero for processing of the first path) from the intermediate buffer are added to the despread and channel estimated symbols from the intermediate buffer, the accumulator is bypassed, and output is sent to intermediate buffers. States 63-66 are repeated until all N relevant multi-paths and base stations are processed at which point, the current MRC accumulation is the final accumulation and this value is output to the symbol processor. Advantageously, this process may be repeated in the case where a receiver is demodulating several channels. After that, in a state 67, the processor 20 sleeps until the next processing interval.

Figure 10:
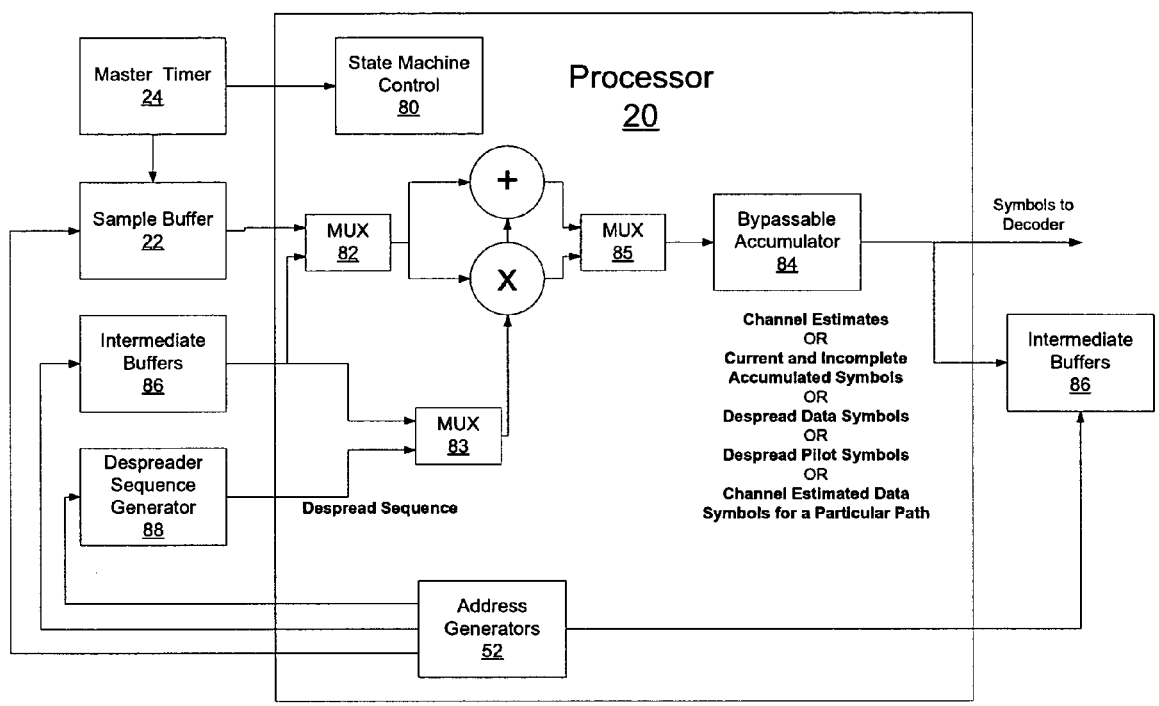
FIG. 10 is a diagrammatic representation of the Accumulated Maximal Ratio Combining (A-MRC) algorithm processing units of FIG. 7 in greater detail.

FIG. 10 illustrates in more detail the processing blocks specific to the A-MRC algorithm described with reference to FIG. 7. The processor 20 includes a state machine control 80 configured to change states as described with reference to FIG. 8. The processor 20 also includes multiplexers (MUX) 82, 83, and 85 directing input from the sample buffers 22, intermediate buffers 86, and despreader sequence generator 88. A bypassable accumulator 84 directs symbols to a decoder and intermediate buffers 86. The bypassable accumulator 84 can output channel estimates, current and incomplete accumulated symbols, despread data symbols, despread pilot symbols, or channel estimated data symbols for a particular path.

In operation, the sample buffer 22 inputs pilot symbols to MUX 82 and the despread sequence generator 88 inputs despread data to MUX 83. These inputs are multiplied and sent to bypassable accumulator 84 via MUX 85. The bypassable accumulator 84 outputs accumulated symbols to intermediate buffers 86. The control of where results are output is dependent upon the state diagram described with reference to FIG. 9.

The A-MRC algorithm serially accumulates to the correct MRC value. Each iteration of the processor 20 in the situation extracts a single multi-path component:

$$f_{i,n} = \sum_{j=1}^{J} c(s(i) + d*j - \tau_n) p_j^*$$

where $f_{i,n}$ is the extracted symbol estimate of the ith symbol for the nth multi-path, c(.) is the contents of the chip sample buffer, J is the spreading factor, s(i) is the beginning of the correlation for the $i^{th}$ symbol, $T_n$ is the multi-path delay, d is the decimation rate, and $p_j$ is the pseudo-nose sequence multiplied by the orthogonal channelization code.

This value is weighted and accumulated in the symbol buffer 54 of the processor 20 according to the following recursion relation $$s_i^0 = 0$$

$$s_i^{n+1} = s_i^n + \alpha_{i,n}^* f_{i,n}$$

where $\alpha_{i,n}$ is the channel estimate of multipath n during the $i^{th}$ symbol. The resultant MRC symbol attains its final value after the number of useful multipath iterations N as $$s_i^N = \sum_{n=1}^{N} \alpha_{i,n}^* f_{i,n}.$$

There are many potential criteria for path selection based on channel estimates. For example, criteria can include not to process paths that have an instantaneous power in excess of $T_1$ dB below the strongest instantaneous multi-path component. Paths that are substantially below a strongest path contribute little to the SNR of the resultant (especially in an interference dominated scenario). Another criteria can be to rank paths in order of strongest to weakest instantaneous powers and not process paths once a threshold of $T_2$ has been reached. This represents a condition where de-codability has been reached and there is no need for processing any more multi-path components.

Greater capacity can be realized by multiple base station antennas referred to as Multiple Inputs (MI) and multiple receive antennas referred to as Multiple Outputs (MO). Together they become MIMO. Multiple transmit (TX) antennas and a single receive (RX) antenna is called Multiple Inputs Single Output (MISO). Having one TX antenna and multiple RX antennas is called Single Input Multiple Outputs (SIMO). MI provides a substantial diversity gain in fading channels, MO provides a diversity gain in addition to a beam-forming gain.

Conventional ASIC implementations consist of dedicated fingers for each combination of TX and RX antennas (i.e. number of instantiations that is product of the number of transmit and receive antennas.) Advantageously, the processor 20 can process all links. In addition, the dynamic processing capabilities of the processor 20 allows a substantial power savings in that only the links (or multi-path within each link) that are sufficiently strong are processed.

Figure 11:
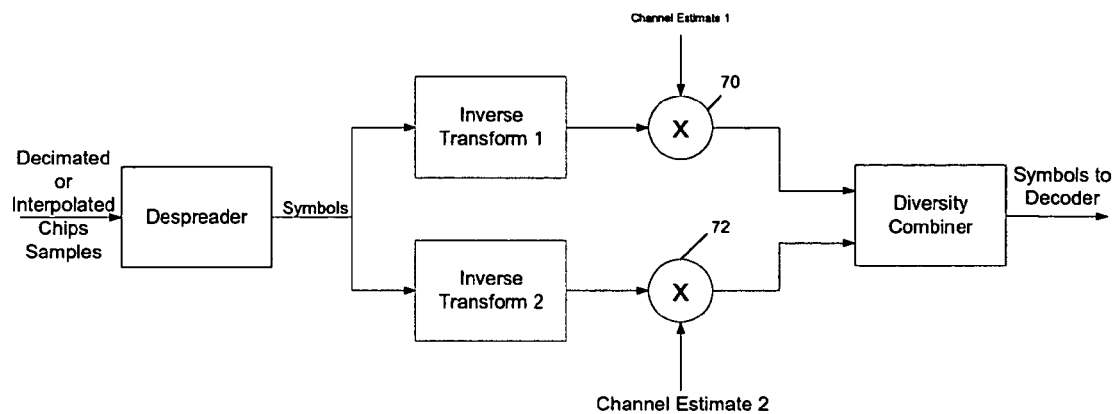
FIG. 11 is a diagrammatic representation of a conventional finger for Multiple Inputs (MI)

FIG. 11 illustrates a conventional finger supporting multiple input antenna (MI). As can be seen, such a finger is forced to contain two multipliers 70 and 72 plus some transformation logic to properly take advantage of the diversity. This results in at least two disadvantages. First, this results in increased cost of an additional multiplier and transform logic per finger. Second, the conventional finger, when enabled, is forced to always process all the incoming antenna path streams. This results in inefficiency in terms of power consumption.

Figure 12:
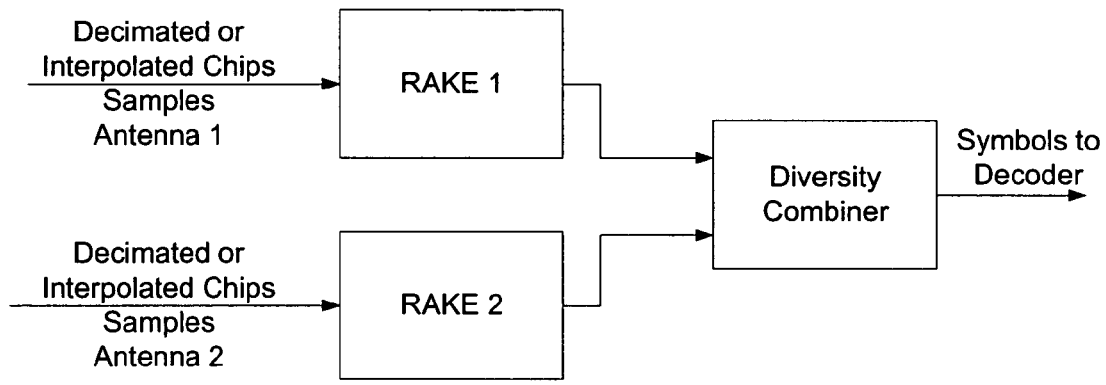
FIG. 12 is a diagrammatic representation of a conventional Multiple Outputs (MO) Receiver.

FIG. 12 illustrates a conventional receiver supporting multiple output antenna (MO). Two sets of conventional demodulators are instantiated and powered in order to support MO because there are two incoming streams from the RF that must be separately demodulated. Adding the two streams, for instance, is not a workable solution since the antennas by definition are out of phase with each other. Thus, in general, MO doubles the cost and power of a conventional implementation.

Figure 13:
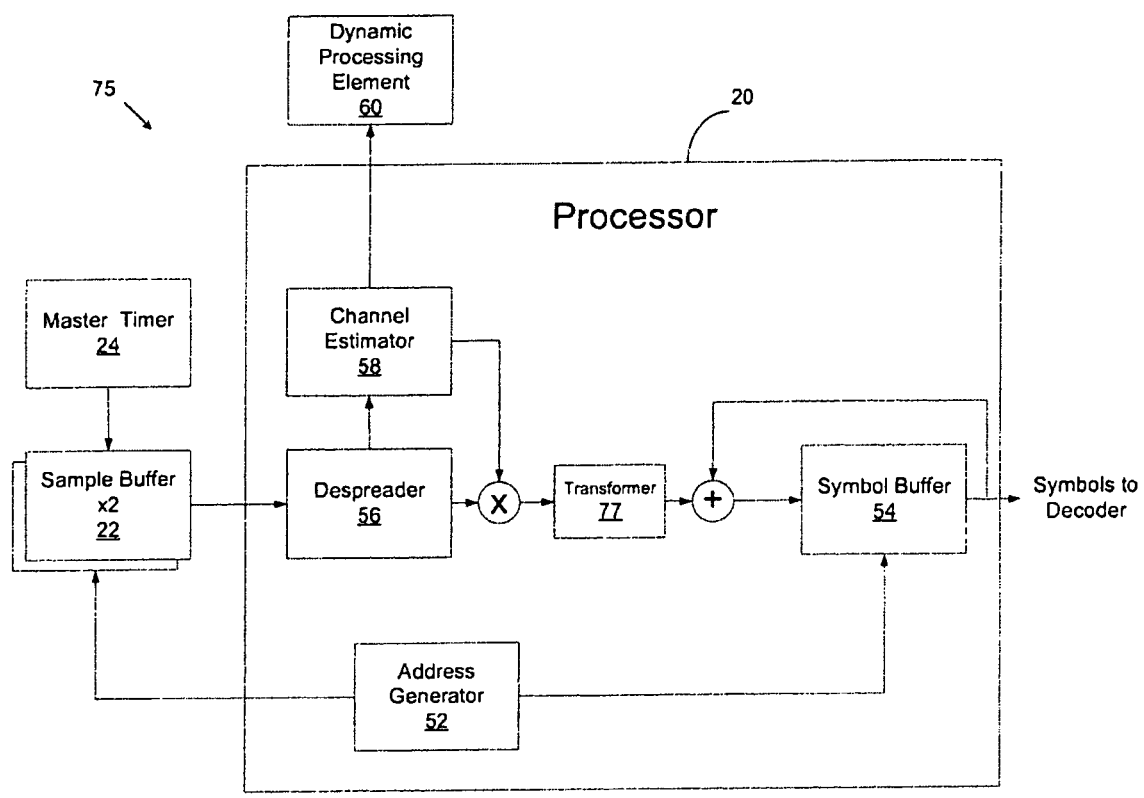
FIG. 13 is a diagrammatic representation of a processor for Accumulated Maximal Ratio Combining (A-MRC) with MIMO in accordance with an exemplary embodiment.

FIG. 13 illustrates a receiver 75 supporting full-fledged MIMO. The receiver 75 treats paths emerging from different BS antennas as well as paths coming from different RX antennas almost the same as another multi-path. With respect to MI, the only addition to the receiver 75 compared to the processing system of FIG. 7 is the necessity of a transformer 77 to handle such operations as STTD in WCDMA. Thus, the A-MRC algorithm can be almost exactly applied for MI with the difference that twice the number of paths could potentially be processed. With respect to MO, the only addition to the receiver 75 compared to the processing system of FIG. 7 is that the sample buffers 22 are doubled to support data coming in from both RF chains. As a result, there is substantial cost savings. With respect to MI, there is no need of an additional multiplier. With respect to MO, additional fingers are not needed. There is also substantial power savings. The processor 20 is not forced to process all combinations of transmit/receive paths in the fingers. Only those antenna paths that are sufficiently strong need to be processed.

In at least one exemplary embodiment, processor 20 is configured for operation with a "burst-pilot" signal where the information sent from the communication base-station used to estimate the cellular channel is time-division multiplexed so that it is present and not present in the forward-link signal at different times. In at least another exemplary embodiment, processor 20 is configured for operation with a "continuous-pilot" where the information sent from the communication base-station used to estimate the cellular channel is always present in the forward link signal transmitted by the base-station.

Figure 18:
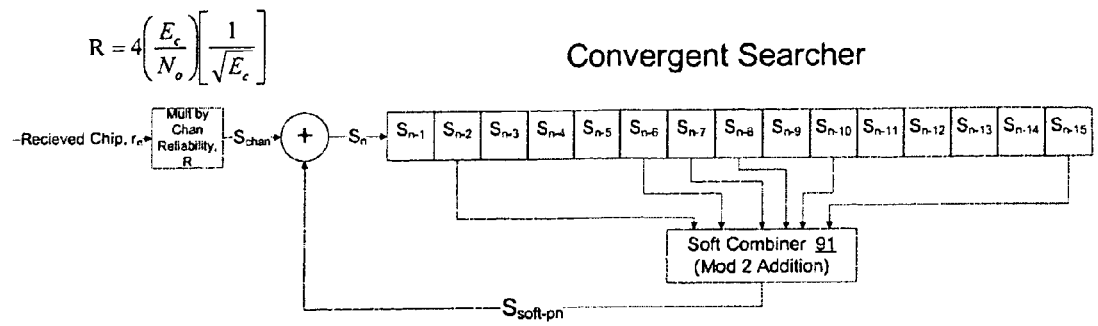
FIG. 18 is a diagrammatic representation of a convergent searcher operation in accordance with an exemplary embodiment.
Figure 19:
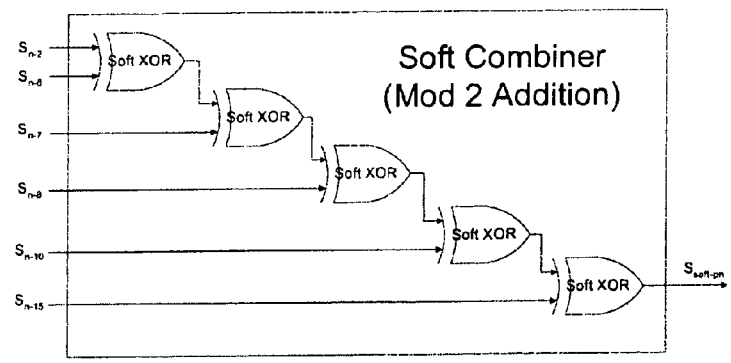
FIG. 19 is a diagrammatic representation of a soft combiner operation included in the convergent searcher operation of FIG. 18.

Finding the multi-path components in a timely manner so that they may contribute to the demodulation of the signal is one of the design challenges in a CDMA receiver implementation. Searching refers to the process of finding multi-path components in a rapidly changing environment. The processor 20 allows for enhanced searcher operation. The convergent searcher function described below with reference to FIGS. 18-19 is a distinct algorithm that allows for fast acquisition of multi-path components and enhances the performance of the CDMA receiver in a rapidly changing multi-path environment.

The processor 20 includes a scheme that does not require separate buffering for the windowed searching operation. As mentioned previously, conventional implementations generally consist of instantiations of "fingers" operating synchronously upon the samples in parallel. The processor 20 serially processes each multi-path one at a time where each iteration through the data is termed a "virtual finger." In addition, channel estimates performed by conventional ASIC hardware are performed by dedicated hardware in addition to the demodulation specific circuitry. The processor 20 does not have this limitation. The same circuitry can be used both for demodulation and channel estimation.

The way that the samples are buffered helps in the operation of the processor 20. In an exemplary embodiment, a three buffer scheme is used which gives access to the entire delay spread of the sub-chip samples to be demodulated by the processor 20. This minimal buffering scheme avoids the time delay of a two buffer scheme where the two physical buffers switch roles once the buffer receiving chips is full. Further, the buffering scheme has an entire multi-path spread worth of digital samples available during each processing iteration. In an alternative embodiment, a single dual-port memory is used to implement the buffering scheme.

Figure 14:
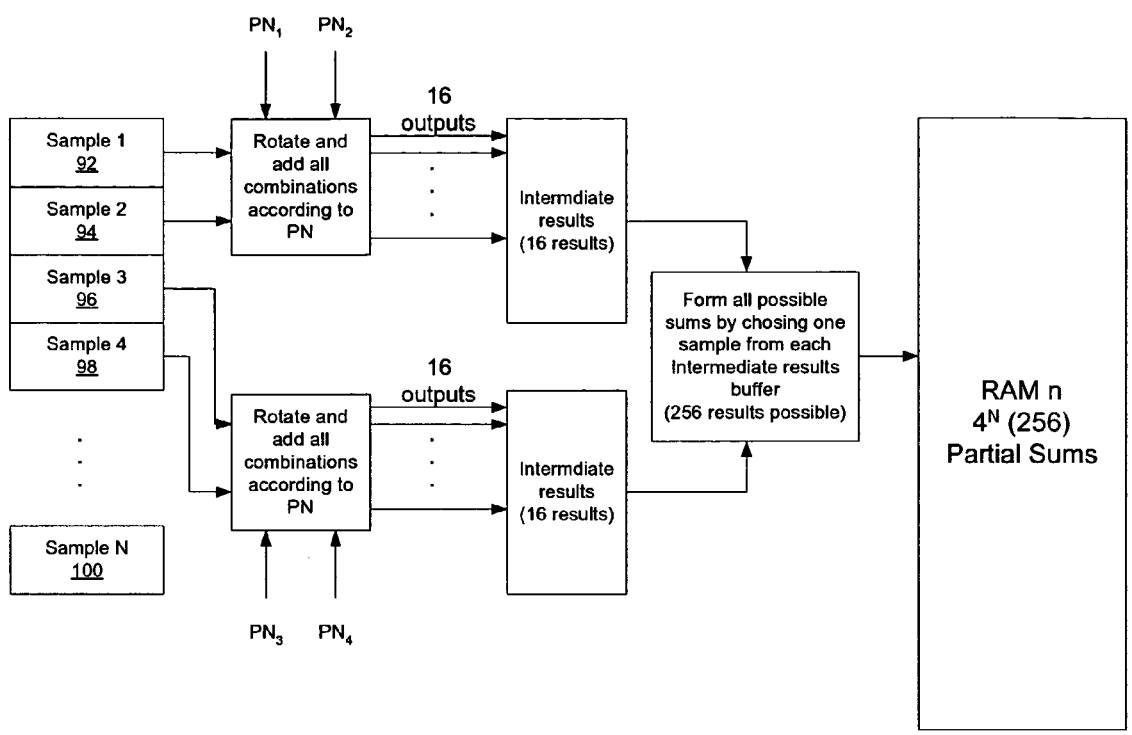
FIG. 14 is a diagrammatic representation of a first phase of an exemplary windowed search process.

FIG. 14 illustrates a first phase of an exemplary windowed search process. The process takes a set of digital complex samples 92, 94, 96, 98, and 100 and determines the correlation of these samples with various hypothesis. In the first phase, all combinations of 4 adjacent chips (samples 92, 94, 96, 98, and 100) are computed for a number of adjacent sets of 4 chips.

Figure 15:
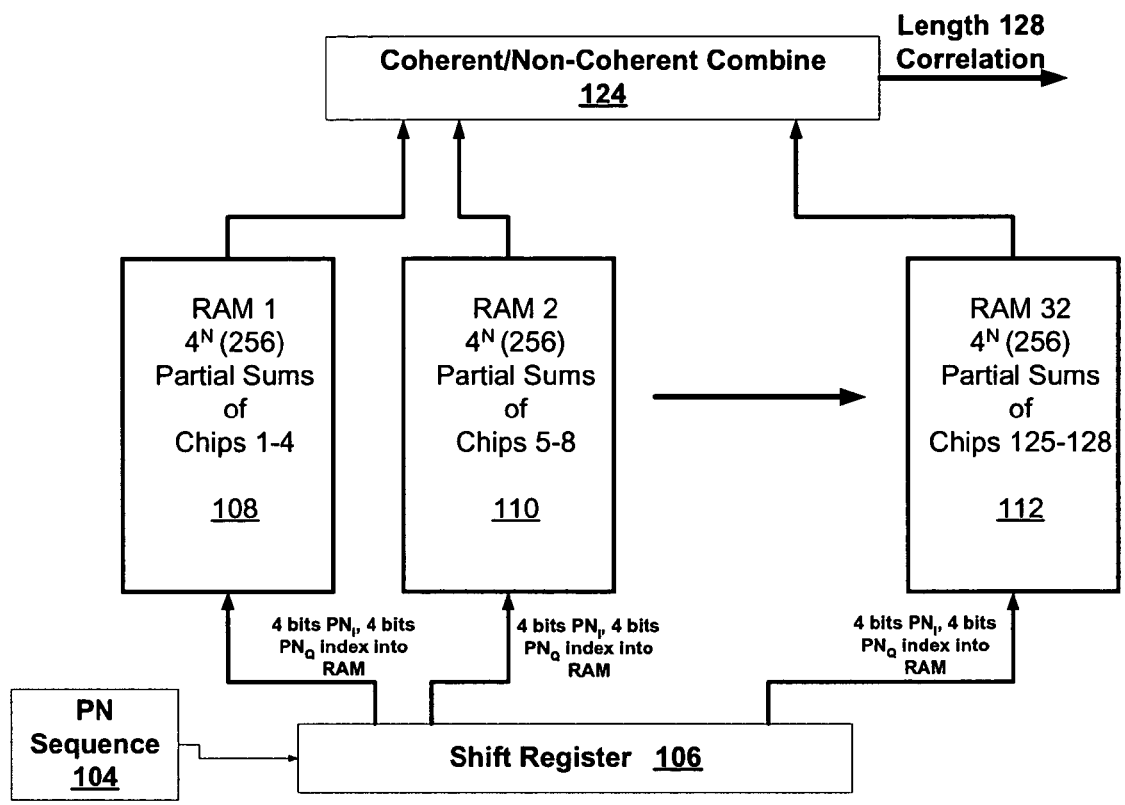
FIG. 15 is a diagrammatic representation of a second phase of an exemplary windowed search process.

FIG. 15 illustrates a second phase of the exemplary windowed search process. In the second phase, the computed combinations from phase one are used to find correlations over multiples of 4 chips. The correlations can be coherent and non-coherent. In the example shown, 128 correlations are found.

In an exemplary embodiment, a PN sequence 104 is received by shift registers 106. Shift registers 106 direct processed chips from the PN sequence 104 to a number of RAM devices (e.g., RAM 1-32). RAM device 108 includes, for example, partial sums of chips 1-4. RAM device 110 includes partial sums of chips 5-8. RAM device 112 includes partial sums of chips 125-128. Correlations from the RAM devices are combined using a combining apparatus 124.

The computation of phase one can be amortized across a large number of hypothesis such that it becomes negligible in the analysis. Advantageously, the number of computations becomes close to a factor of 4 reduction relative to conventional algorithms, given a sufficiently large set of PN hypothesis to be correlated against.

Conventional techniques for searching for CDMA multi-paths typically involve a "windowed" search where correlations are made within a specified window of chips of known energy, looking for a correlation that is greater than a specified threshold. This function is performed with a separate finger in the conventional correlator called a searcher.

Figure 16:
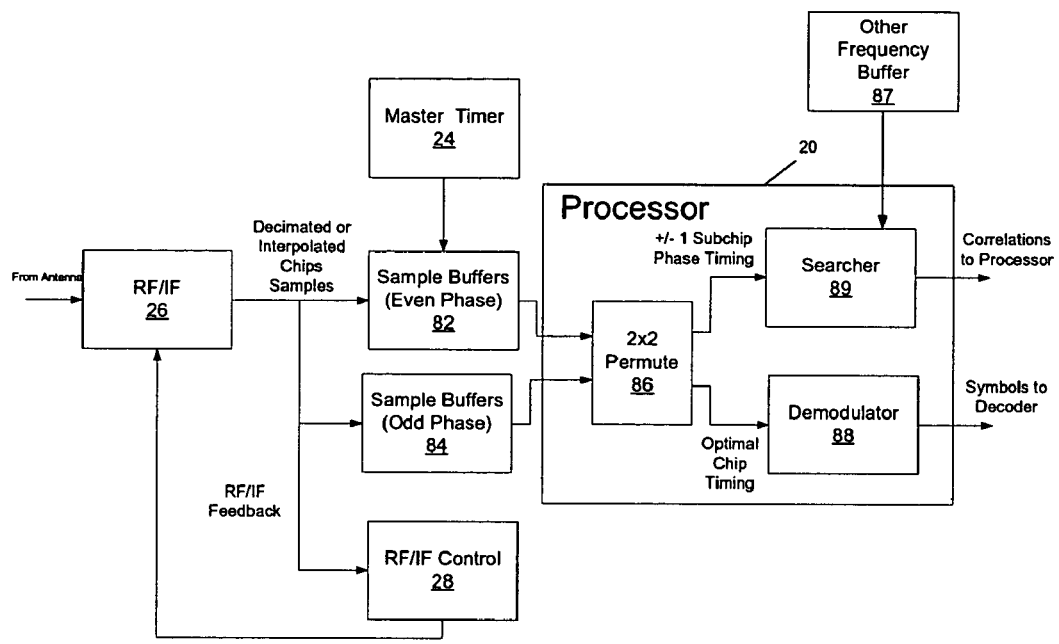
FIG. 16 is a diagrammatic representation of a windowed searcher implementation in accordance with an exemplary embodiment.

The processor 20 described with reference to FIG. 2 can perform a windowed search. An additional search functionality referred to as a convergent searcher is described below with reference to FIGS. 20-21. Referring now to FIG. 16, the processor 20 receives samples from sample buffers 82 and 84. The sample buffer 82 provides even phase samples and the sample buffer 84 provides odd phase samples. A 2×2 permute block 86 supplies a demodulator 88 with on-time samples such that the signal energy is maximized. The other set of sample buffers is for use with a searcher 89. The searcher 89 gets either the odd phase or the even phase samples, whichever is not used by the demodulator 88, whenever the searcher 89 and the demodulator 88 contend for the same memory block.

After acquisition, the searcher 89 operates on samples that are either $\frac{1}{8}^{th}$ chip early or $\frac{1}{8}^{th}$ chip late, but this slight degradation in energy impacts operation of the searcher 89 only minimally.

In operation, the windowed searcher function performs a sufficient number of correlations, then shuts down until a new block of data is available. As such, hardware idle cycles are avoided. In an exemplary embodiment of a frequency search feature, a buffer 87 is used to store digital samples obtained at a different frequency than an original frequency. Using an additional buffer has the advantage of storing samples for possible use later. Alternatively, the digital samples obtained at a different frequency can be placed in sample buffers 82 and 84 for a receive iteration and a processing iteration.

Figure 17:
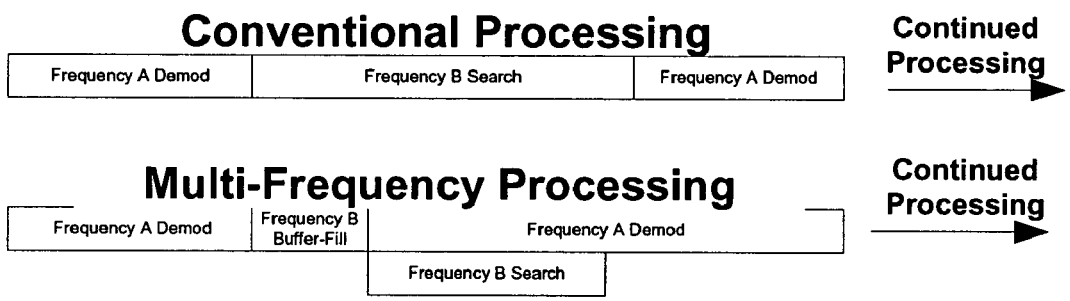
FIG. 17 is a diagrammatic representation comparing a frequency search feature of an exemplary embodiment to conventional processing.

FIG. 17 illustrates a frequency search feature of an exemplary embodiment compared with frequency search accomplished by conventional processing. In an exemplary embodiment, the processor 20 allows for baseband processing of signals while the RF is either shut-off or tuned to a different frequency. One benefit of this technique is a more effective inter-frequency search.

FIG. 17 shows that a search for base stations at other frequencies can be performed "off-line" after an initial buffer fill. One benefit is that the time-consuming process of testing various PN offsets via coherent and non-coherent combinations of correlations can be performed while tuned to the demodulation frequency. This potentially enhances system performance by either: reducing the amount of time necessary for making other frequency measurements, or allowing for less data loss from the current frequency assignment during other frequency measurements.

In an exemplary embodiment, the frequency search feature utilizes the same sample buffers used with the original frequency. The sample buffers receive the digital samples from the new frequency in one iteration and process them in a next iteration. After the original frequency is returned to, the sample buffers continue in use. In another exemplary embodiment, a separate buffer is used for new frequency, such as buffer 87 described with reference to FIG. 17. Use of a separate buffer has the advantage of maintaining the digital samples received at the new frequency even after returning to the original frequency.

FIG. 18 illustrates a convergent searcher operation. A received chip, $r_n$, is multiplied by channel reliability, R, to obtain a channel measurement, $S_{channel}$. Channel reliability can be computed from the equation:

$$R = 4\left(\frac{Ec}{No}\right)\left[\frac{1}{\sqrt{Ec}}\right]$$

The convergent searcher operation converges to the correct PN state using noisy chip measurements of the pilot. Channel measurements are used as a soft input and added to a soft output feedback from a soft combiner 91. This soft input is used to compute log-likelihoods. The soft combiner 91 performs a mod 2 addition to a group of channel measurements, $S_{n-1}$ though $S_{n-15}$. The soft combiner 91 can be implemented by a series of soft XOR operations as described with reference to FIG. 19. A soft XOR operation is a combining operation where the output $S_T$ from inputs $S_1$ and $S_2$ is defined by the following mathematical relationship:

$$S_T = \ln\left(\frac{\frac{e^{S_1+S_2}}{(1+e^{S_1})(1+e^{S_2})} + \frac{e^{-(S_1+S_2)}}{(1+e^{-S_1})(1+e^{-S_2})}}{\frac{e^{S_1-S_2}}{(1+e^{S_1})(1+e^{-S_2})} + \frac{e^{-(S_1+S_2)}}{(1+e^{-S_1})(1+e^{S_2})}}\right)$$

In an exemplary embodiment, the soft XOR operation is implemented via a look-up-table.

Advantageously, the convergent searcher operation of FIG. 18 acquires PN synchronization without a priori knowledge of a last known PN like conventional searchers. The convergent searcher operation is capable of finding dominant multi-paths in fewer operations than a windowed searcher operation. Other advantages possible by the convergent searcher operation include the following. First, the operation provides for rapid acquisition of strong pilots that may be missed by a conventional windowed searcher when the path comes in rapidly. Second, the operation enables neighbor set maintenance during idle mode to be performed much more rapidly, which results in a 2× increase in stand-by time for a mobile device. Third, the operation provides for rapid acquisition.

FIG. 19 illustrates a detailed implementation of the soft combiner 91 of FIG. 18. The convergent searcher operation of FIG. 18 is specific to the PN I (In-Phase) sequence for and defined by the recursion:

$$I_n = I_{n-15} + I_{n-10} + I_{n-8} + I_{n-7} + I_{n-6} + I_{n-2}$$

The Ec/No for quick convergence (around 0 dB) of this technique is higher than the power at which the pilot currently operates. In an exemplary embodiment, the base station dedicates slots of time at which the pilot signal is transmitted at 100% of the operating power.

Figure 20:
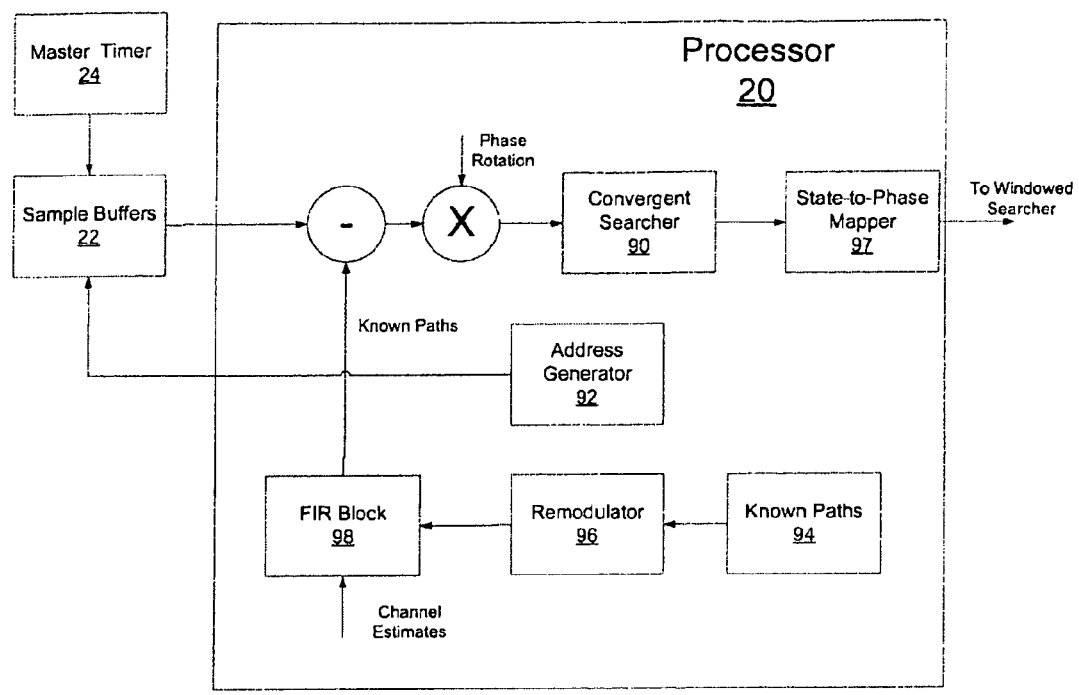
FIG. 20 is a diagrammatic representation of a convergent searcher implementation in accordance with an exemplary embodiment.

FIG. 20 illustrates an exemplary implementation of the convergent searcher operation by the processor 20. The convergent searcher 90 receives samples including a phase rotation from a subtraction of samples from the sample buffers 22 and known paths from a FIR block 98. FIR (finite impulse response) block 98 is a pulse shaping filter. Known paths 94 are re-modulated by a re-modulator 96 and provided to the FIR block 98 along with channel estimates.

Figure 21:
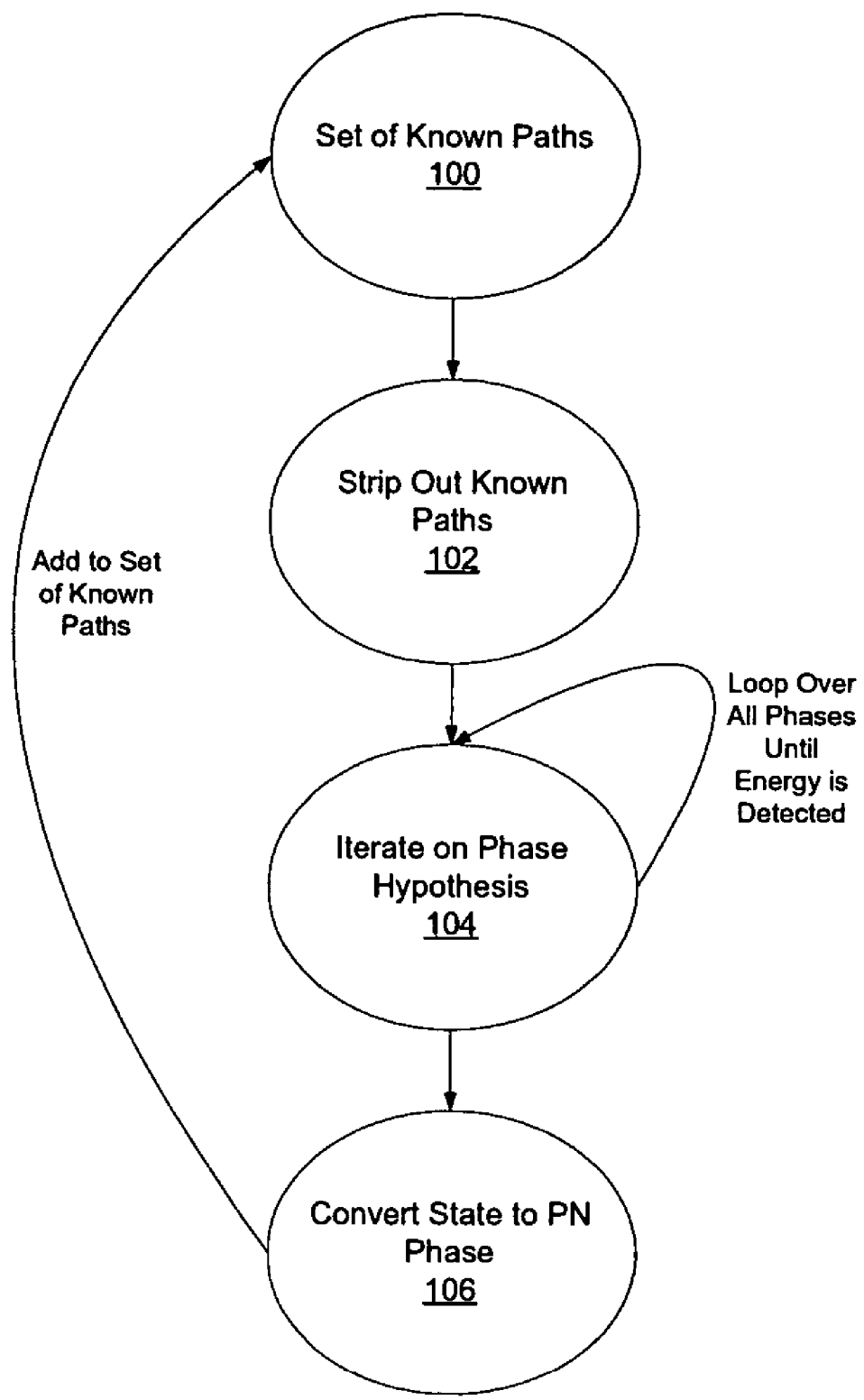
FIG. 21 is a state diagram depicting operations in the convergent searcher implementation of FIG. 18.

FIG. 21 illustrates a state diagram depicting convergent searcher operations performed by the processor 20. In operations 100 and 102, the current set of known paths (which is empty during acquisition) is re-modulated and subtracted out. This separation aids in finding the weaker multi-paths once the stronger ones have been detected. In addition, the instantaneous fading of strong multi-paths aids in this process.

The phase rotation is introduced before the convergent searcher block because phase rotation of the multi-path is not known. In an operation 104, the phase rotation hypothesis is iterated upon. Once the phase rotation aligns with the phase of the strongest unknown pilot, convergence is indicated. Hard decisions are made on the soft-decision states, and this state is mapped to a PN phase in an operation 106 which is sent to the windowed searcher for verification and accurate measurement.

While the above exemplary embodiments have been described with regard to code division multiple access (CDMA), other communication protocols and techniques can be utilized. Further, system parameters and design criteria can effect the particulars of the design without departing from the scope of the invention. The invention is not limited to a particular embodiment, but extends to various modifications, combinations, and permutations that nevertheless fall within the scope and spirit of the appended claims.

What is claimed is:

1. A method of processing digital communication signals in a system including a receiver, a processor and a plurality of buffers, the method comprising:

buffering first digital samples received from the receiver and corresponding to a first group of symbols into a first buffer and a second buffer at a sample rate, wherein buffered first digital samples corresponding to earlier paths of the first group of symbols are stored in the first buffer, and buffered first digital samples corresponding to later paths of the first group of symbols are stored in the second buffer;

processing, by the processor, the first digital samples in the first buffer and the second buffer for all known paths of the first group of symbols during a first symbol group duration, wherein the processor is clocked by a processor clock at a clock rate that is faster than and not synchronous with the sample rate;

disabling the processor upon completion of processing the first digital samples by gating off the processor clock, wherein the processor remains disabled through a remainder of the first symbol group duration;

simultaneously with processing the first digital samples, buffering second digital samples corresponding to a second group of symbols into the second buffer and a third buffer, wherein buffered second digital samples corresponding to earlier paths of the second group of symbols are stored in the second buffer, and buffered second digital samples corresponding to later paths of the second group of symbols are stored in the third buffer, and wherein the first symbol group duration represents a duration of time during which the second digital samples are buffered into the second buffer and the third buffer, and wherein buffering the second digital samples from the receiver is capable of occurring while the processor is disabled during the remainder of the first symbol group duration;

after completion of buffering the second digital samples and at a beginning of a second symbol group duration that occurs consecutively with an end of the first symbol group duration, enabling the processor to process the second digital samples;

processing, by the processor, the second digital samples in the second buffer and the third buffer for all known paths of the second group of symbols during the second symbol group duration;

disabling the processor upon completion of processing the second digital samples by gating off the processor clock, wherein the processor remains disabled through a remainder of the second symbol group duration;

simultaneously with processing the second digital samples, buffering third digital samples received from the receiver and corresponding to a third group of symbols into the third buffer and the first buffer, wherein buffered third digital samples corresponding to earlier paths of the third group of symbols are stored in the third buffer, and buffered third digital samples corresponding to later paths of the third group of symbols are stored in the first buffer, and wherein the second symbol group duration represents a duration of time during which the third digital samples are buffered into the third buffer and the first buffer, and wherein buffering the third digital samples from the receiver is capable of occurring while the processor is disabled during the remainder of the second symbol group duration;

after completion of buffering the third digital samples and at a beginning of a third symbol group duration that occurs consecutively with an end of the second symbol group duration, enabling the processor to process the third digital samples;

processing the third digital samples in the third buffer and the first buffer for all known paths of the third group of symbols during the third symbol group duration; and disabling the processor upon completion of processing the third digital samples by gating off the processor clock, wherein the processor remains disabled through a remainder of the third symbol group duration.

2. The method of claim 1, wherein the plurality of buffers hold a number of digital samples, the number being adjusted for communication conditions.

3. The method of claim 2, wherein the communication conditions include a communication technology and anticipated maximum useful multi-path delay in an environment.

4. The method of claim 1, wherein received information relevant to a given group of transmitted symbols is processed in one iteration, without a need to store intermediate results for the given group of transmitted symbols.

5. The method of claim 1, further comprising tuning a receiver to a first channel, storing received symbols from the first channel, and tuning the receiver to a second channel.

6. The method of claim 5, further comprising processing symbols received from the first channel during extra cycles of processing while the receiver is tuned to the second channel.

7. A method of processing digital communication signals in a system including a receiver, a processor, and a plurality of buffers, the method comprising:

processing, by the processor during a first symbol group duration, symbols corresponding to a first group of symbols to be processed and from all known paths, wherein the first group of symbols in a first path start in a first buffer and end in a second buffer;

receiving samples from the receiver at a third buffer simultaneously with processing the first group of symbols;

disabling the processor upon completion of processing the symbols corresponding to the first group by gating off the processor clock, wherein the processor remains disabled through a remainder of the first symbol group duration, wherein the first symbol group duration ends when samples in the third buffer are ready for processing, and wherein receiving the samples at the third buffer is capable of occurring while the processor is disabled;

processing, by the processor during a second symbol group duration, symbols corresponding to a second group of symbols to be processed and from all known paths, wherein the second group of symbols in a second path start in the second buffer and end in the third buffer;

receiving samples from the receiver at the first buffer simultaneously with processing the second group of symbols;

disabling the processor upon completion of processing the symbols corresponding to the second group by gating off the processor clock, wherein the processor remains disabled through a remainder of the second symbol group duration, wherein the second symbol group duration ends when samples in the first buffer are ready for processing, and wherein receiving the samples at the first buffer is capable of occurring while the processor is disabled;

processing, by the processor during a third symbol group duration, symbols corresponding to a third group of symbols to be processed and from all known paths, wherein the third group of symbols in a third path start in the third buffer and end in the first buffer, and receiving samples at the second buffer while the third group of symbols is being processed;

receiving samples at the receiver at the second buffer simultaneously with processing the third group of symbols;

disabling the processor upon completion of processing the symbols corresponding to the third group by gating off the processor clock, wherein the processor remains disabled through a remainder of the third symbol group duration, wherein the third symbol group duration ends when samples in the second buffer are ready for processing, and wherein receiving the samples at the second buffer is capable of occurring while the processor is disabled; and adapting duration time of the processing of the first, second, and third groups based on channel and signal conditions.

8. An apparatus to process digital communication signals, the apparatus comprising:

a plurality of buffers coupled to a receiver and configured to store digital samples received from the receiver and corresponding to groups of symbols;

a processing unit coupled to the plurality of buffers; and programmed memory having instructions directing the processing unit to process first digital samples corresponding to a first group of symbols to be processed in a plurality of buffers, the first digital samples starting in a first buffer of the plurality of buffers and ending in a second buffer of the plurality of buffers;

wherein the processing unit processes the first digital samples during a first symbol group duration, and wherein additional digital samples are received at a third buffer of the plurality of buffers simultaneously with the first digital samples being processed, and wherein the first symbol group duration represents a duration of time that ends upon completion of synchronously filling the third buffer with the additional digital samples, and wherein, prior to an end of the first symbol group duration, the processing unit is disabled upon completion of processing the first digital samples by gating off the processor clock, wherein the processor remains disabled through a remainder of the first symbol group duration, and wherein the buffers are capable of receiving the digital samples from the receiver while the processor is disabled.

9. The apparatus of claim 8, further comprising input and output busses operable to permit random access to the plurality of buffers during processing.

10. The apparatus of claim 8, wherein symbols are processed in a different group of buffers after a process iteration is complete.

11. A method of processing digital communication signals, the method comprising:

receiving a communication signal at a receiver;

communicating digital samples from the received communication signal into a first group of sample buffers, wherein the digital samples include first symbols, and wherein the first group of sample buffers receive and store the digital samples communicated by the receiver;

processing, by a processor during a first symbol group duration, the first symbols in the first group of sample buffers while simultaneously communicating, receiving, and storing additional digital samples from the receiver into a second group of sample buffers during the processing, wherein the additional digital samples include second symbols, and wherein the first symbol group duration represents a duration of time during which the second group of sample buffers is filled with the additional digital samples;

prior to an end of the first symbol group duration, disabling the processor upon completion of processing the first symbols in the first group of sample buffers by gating off the processor clock, wherein the processor remains disabled through a remainder of the first symbol group duration, and wherein communicating, receiving, and storing the additional digital samples into the second group of sample buffers continues to occur while the processor is disabled; and after completion of communicating, receiving, and storing the additional digital samples in the second group of sample buffers and at a beginning of a second symbol group duration, enabling the processor to process the second symbols in the second group of sample buffers during the second symbol group duration, wherein the beginning of the second symbol group duration occurs consecutively with the end of the first symbol group duration.

12. The method of claim 11, further comprising, after symbols in a symbol path are completely processed, designating sample buffers in the first group of sample buffers as being in the second group of sample buffers; and designating sample buffers in the second group of sample buffers as being in the first group of sample buffers, whereby sample buffers are rotated between processing iterations and digital sample receiving operations.

13. The method of claim 12, wherein sample buffers in the first group of sample buffers designated as being in the second group of sample buffers include all the sample buffers in the first group of sample buffers except a sample buffer having an end of a symbol path.

14. A method of processing digital communication signals in a system including a receiver, a processor and a plurality of buffers, the method comprising:

processing, by the processor during a first symbol group duration, first samples corresponding to a first group of symbols to be processed, wherein the first samples start in a first buffer and end in a second buffer, and simultaneously receiving second samples from the receiver at a third buffer during the processing of the first group of symbols, wherein the second samples correspond to a second group of symbols to be processed, and the first symbol group duration represents a duration of time that ends upon completion of synchronously filling the third buffer with the second samples;

prior to an end of the first symbol group duration, disabling the processor upon completion of processing the first samples corresponding to the first group by gating off the processor clock, wherein the processor remains disabled during a remainder of the first symbol group duration, and wherein receiving the second samples continues to occur while the processor is disabled;

processing, by the processor during a second symbol group duration, the second samples corresponding to the second group of symbols to be processed, wherein the second samples start in the second buffer and end in the third buffer, and simultaneously receiving third samples at the first buffer during the processing of the second group of symbols, wherein the third samples correspond to a third group of symbols to be processed, and the second symbol group duration represents a duration of time that ends upon completion of synchronously filling the first buffer with the third samples;

prior to an end of the second symbol group duration, disabling the processor upon completion of processing the symbols corresponding to the second group by gating off the processor clock, wherein the processor remains disabled during a remainder of the second symbol group duration, and wherein receiving the third samples continues to occur while the processor is disabled;

processing, by the processor during a third symbol group duration, the third samples corresponding to the third group of symbols to be processed, wherein the third samples start in the third buffer and end in the first buffer, and simultaneously receiving fourth samples at the second buffer while during the processing of the third group of symbols, wherein the fourth samples correspond to a fourth group of symbols to be processed, and the third symbol group duration represents a duration of time that ends upon completion of synchronously filling the second buffer with the fourth samples; and prior to an end of the third symbol group duration, disabling the processor upon completion of processing the symbols corresponding to the third group by gating off the processor clock, wherein the processor remains disabled during a remainder of the third symbol group duration, and wherein receiving the fourth samples continues to occur while the processor is disabled.

15. An apparatus to process digital communication signals, the apparatus comprising:

a plurality of buffers coupled to a receiver and configured to store digital samples received from the receiver and corresponding to groups of symbols;

a processing unit coupled to the plurality of buffers; and programmed memory having instructions directing the processing unit to process first digital samples corresponding to a group of symbols to be processed in a plurality of buffers, the first digital samples starting in a first buffer of the plurality of buffers and ending in a second buffer of the plurality of buffers;

wherein the processing unit processes the first digital samples during a first symbol group duration, and wherein additional digital samples are received from the receiver at a third buffer of the plurality of buffers simultaneously with the first digital samples being processed, and wherein the processing unit is operable to select digital samples or an intermediate result from a buffer coupled to the processing unit, and wherein, prior to an end of the first symbol group duration, the processing unit is disabled upon completion of processing the first digital samples by gating off the processor clock, wherein the processor remains disabled through a remainder of the first symbol group duration, wherein receiving the additional digital samples from the receiver at the third buffer is capable of occurring while the processor is disabled, and wherein the processor is enabled after all of the additional digital samples are received at the third buffer and simultaneously with a beginning of a second symbol group duration, wherein the end of the first symbol group duration coincides with the beginning of the second symbol group duration.

* * * * *